May 17, 1966   M. C. ZIETZ   3,251,525
APPARATUS FOR SEALING TUBULATION
Filed Oct. 5, 1960

M. CHARLES ZIETZ
  INVENTOR

BY Leon F. Herbert
   Robert W. Dilts
         ATTORNEYS 3,251,525
APPARATUS FOR SEALING TUBULATION
Milton Charles Zietz, Palo Alto, Calif., assignor, by mesne assignments, to Varian Associates, a corporation of California
Filed Oct. 5, 1960, Ser. No. 60,646
8 Claims. (Cl. 228—13)

This invention relates generally to apparatus for pressure sealing tubulations such as the exhaust tubulation of evacuated envelopes (for example, electronic vacuum tube envelopes).

After an electronic vacuum tube has been processed, the tubulation is sealed off. In one type of vacuum tube, the tubulation is made of copper. Upon completion of processing, the tubulation is sealed by pressure welding, with or without the application of heat.

The common method for performing this seal is to compress or squeeze the tubulation between mating jaws and apply a substantial pressure. The welding is achieved by flow of the copper. In general, the jaws also pinch off the tubulation. The tubulation is allowed to flow freely in all directions during the sealing process with the result that the tubulation flares out and the width of the flare is approximately one and one-half the diameter of the original tubing. A metal cap is generally placed over the sealed tubulation. The size of the cap is usually limited, and thus limits the size of the tubulation which can be employed.

It is known that the speed and efficiency of outgassing and processing of a tube is dependent, in part, upon the size of the tubulation. In general, with a larger tubulation, there is a reduction in processing time for the same ultimate pressure within the envelope, or a lower ultimate pressure for the same processing time.

To change the size of the tubulation in a manner that requires changing the cap size leads to prohibitive costs that more than negate the savings arising from improved processing speed and efficiency.

It is an object of the present invention to provide an improved method and apparatus for sealing tubulation.

It is another object of the present invention to provide a method and apparatus in which flare out is minimized.

It is another object of the present invention to provide a method and apparatus for sealing tubulation in which material is built up at the edges of the seal.

It is another object of the present invention to provide an improved air-tight seal at the end of a tubulation.

The foregoing and other objects are, in general, achieved by employing a pair of jaws one of which includes a notch for receiving the tubulation and confining the same to limit flaring, and the other of which includes a finger which cooperates with the notch to collapse and compress the tubing walls.

Reference to the accompanying drawings and description will clarify the foregoing objects and bring out other objects and features of the invention.

Figure 1:
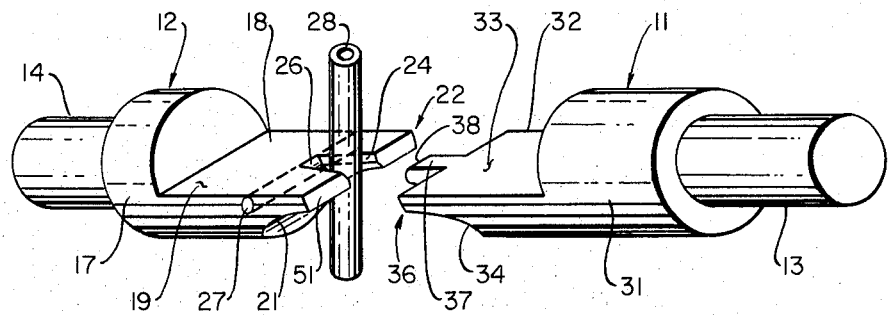
Figure 2:
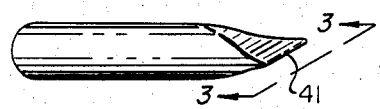
Figure 3:
Figure 4:
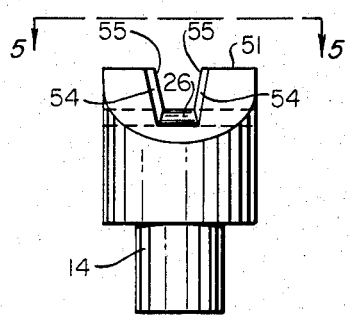
Figure 5:
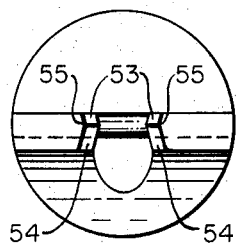
Figure 6:
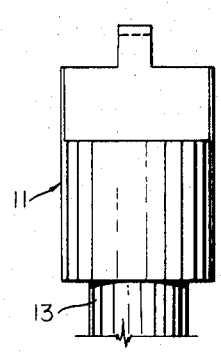
Figure 7:
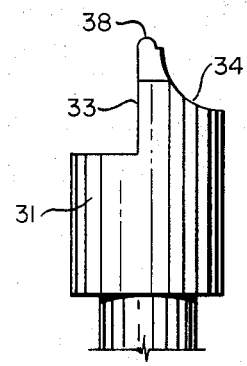

Referring to the drawing:
FIGURE 1 is a perspective view showing the sealing jaws and a tubulation;
FIGURE 2 is a perspective view of a tubulation sealed in accordance with the present invention;
FIGURE 3 is a view taken along the line 3—3 of FIGURE 2;
FIGURE 4 is a plan view of the female portion of the sealing jaw;
FIGURE 5 is a view taken along the line 5—5 of FIGURE 4;
FIGURE 6 is a plan view of the male portion of the sealing jaws; and
FIGURE 7 is a side elevational view of the male portion.

Referring to FIGURE 1, there is illustrated a male jaw 11 which cooperates with the female jaw 12. The jaws include shank portions 13 and 14 for mounting in a suitable press.

The female jaw includes a cylindrical portion 17 and an integral semi-cylindrical portion 18 having a plane surface at 19. The portion 18 is cut on a radius 21 to form a projecting end 22 which is notched at 24. An anvil 26 is disposed at the bottom of the notch. The anvil may, for example, comprise a hardened steel rod extending through the accommodating hole 27 formed in the jaw. The width of the notch 24 is selected to accommodate the tubulation 28.

The cooperating male jaw 11 includes a cylindrical portion 31, an integral semi-cylindrical portion 32 having a plane surface 33, and is cut out on a radius 34 to form a projecting end 36. The projecting end 36 is machined to provide an outwardly extending finger 37 which is adapted to fit freely into the notch 24. The end portion of the finger has a rounded configuration 38, as will be presently described.

As the jaws are forced together, the tubulation is collapsed and pressed together. The metal then flows to form a suitable seal, and to pinch off the tubulation.

During a sealing operation, the material of the tubulation is confined by the sides of the notch 24; thus lateral flaring is limited. The material will tend to build up some at the edges and will then flow in a substantially axial direction. The resulting sealed tubulation has a flare 41 (FIGURES 2 and 3) which has a width determined by the width of the notch 24 and can be made substantially equal to the diameter 42 of the tubulation.

The notch 24 is designed to guide the tubulation for insertion and to permit easy removal of the tubulation following a sealing operation. To achieve these results, the notch 24 has a configuration substantially as shown in FIGURES 4 and 5. The edges of the notch are relieved by cutting to form surfaces 53 and 54 which are inclined outwardly from the axis. In the specific embodiment shown, the surfaces 53 and 54 are planar and meet to form a dihedral angle having an edge 55. The notch is wider at the face 51 than at the anvil 26. That is, the edge of the dihedral angle is inclined outwardly from the longitudinal axis. The end of the notch adjacent the anvil is of substantially the width desired for the flare. The lower end of the notch inclines slightly outwardly. As a result, a narrow portion is formed adjacent the surface of the anvil. As formed, the notch is such that the tubulation can be easily removed. That is, the regions of the notch above and below the seal and on the two sides of the seal are wider to provide relief for the seal as it is formed.

The finger of the male die is rounded at 38 and cooperates with the steel rod 26 to collapse the tubulation and force the same together to form a suitable seal. It will be apparent that the diameter of the drill rod and curvature of the rounded portion 38 should be selected such that there is a compressive action rather than a cutting action which would cutoff the tubulation without causing a flow of the material to form the seal. The minimum radius of curvature of the rounded portion 38 and rod 26 is dependent upon the wall thickness of the material and the composition and diameter of the tubulation, and can be arrived at by trial and error.

By way of example, the radius of curvature of the rounded portion 38 and the steel rod 26 which were found to be successful in "pinching off" various size tubulation are as follows:

| Radius, inch | Tube—outside diameter, inch | Wall thickness, inch |
|---|---|---|
| 3/8 | 3/4 | .035 |
| 3/8 | 1 | .070 |
| 3/8 | 1/4 | .035 |

The semi-cylindrical portions 18 and 32 of the female and male jaws include plane surfaces 19 and 33. The plane surfaces are adapted to accommodate the adjacent portions of a vacuum tube. This guides the tube and permits forming the seal adjacent the tube envelope whereby the pinched off tubulation projects a minimum amount.

In instances where the tubulation is of relatively large diameter, it is preferable to carry out the sealing operation and pinch-off in two steps. First, a force is applied to collapse the tubing and to start the flow of material. However, due to the large deformation required, the tubulation work hardens requiring a higher pressure to form a seal. If the pressure is increased to complete the sealing operation in one stage, there might be fracture of the tubulation due to the brittleness of the work hardened tubulation, and the vacuum seal would be defective. Also, there would be excessive wear of the jaws.

To overcome this after the initial collapse and flow has taken place, or after the resistance to deforming of the work hardened material is too large for the applied pressure, the tubulation is annealed and cleaned. Then, the same or larger force is applied to cause a further collapse of the tubulation. If the tubulation is not able to be pinched off due to more work hardening, the annealing process is repeated and then force is applied to cause further collapse and finally separation.

By way of example, for a one inch diameter tubulation, the initial pressures of approximately 1000 lbs. per square inch were found satisfactory. The tubulation was then annealed and chemically cleaned. Subsequently, pressures ranging between 1500 and 2500 lbs. per square inch were applied for final sealing and pinch-off. Only two collapsing steps were required for one inch diameter tubulation. The resulting seals were excellent and the material separated smoothly at pinch-off.

It is observed from FIGURES 2 and 3 that the resulting pinch-off has a diameter substantially equal to the diameter of the tubulation whereby the size of the tubulation may be increased without increasing the size of caps or cover. For the same size cap, one can obtain a substantial increase in the diameter of the tubulation which can be employed.

This leads to a reduction of processing time for the same ultimate pressure or a lower ultimate pressure for the same processing time.

I claim:

1. Sealing apparatus for sealing tubulation comprising first and second jaws adapted to compress a portion of a tubulation presented thereto, said first jaw including a notch, an anvil member disposed at the bottom of said notch, said second jaw including a finger adapted to fit within the notch and including an end adapted to cooperate with the anvil to compress a tubulation therebetween, said notch serving to confine the lateral expansion of the tubulation.

2. Apparatus as in claim 1 in which the notch is relieved.

3. Apparatus as in claim 1 wherein the side walls of the notch are substantially V-shaped.

4. A sealing apparatus for sealing tubulation including first and second jaws each having a cylindrical section with a projection disposed on one end of each cylindrical section, said projection on said second jaw having a finger protruding therefrom in line with said projection, said finger having a semi-cylindrical end, said projection on said first jaw having a notch formed therein, and an anvil member disposed at the bottom of said notch, said anvil member comprising a cylindrical rod disposed in a hole formed in said projection.

5. Apparatus as in claim 4 in which the notch is relieved.

6. Apparatus as in claim 4 in which the notch is substantially V-shaped.

7. Sealing apparatus for sealing a tubulation, comprising two jaws having parallel cutting surfaces adapted to abut each other upon the movement of one jaw toward the other, and lateral wall means at the ends of said parallel cutting surfaces when said cutting surfaces are in abutting position, the distance between said lateral wall means being substantially the same as the length of said cutting surfaces, whereby a tubulation will be engaged across its entire diameter by said cutting surfaces and spreading of said tubulation beyond said lateral wall means will be prevented when said tubulation is acted upon by said apparatus.

8. Sealing apparatus for sealing a tubulation, said apparatus comprising first and second cutting and restraining surfaces adapted to compress between them a tubulation having its axis presented perpendicularly thereto, the first of said surfaces having a concave shape facing the second of said surfaces and the second of said surfaces having a convex shape adapted to be received in said concave shape, whereby said tubulation will be engaged across its entire diameter and increase in said diameter will be limited by said cutting and restraining surfaces when said tubulation is acted upon by said apparatus.

References Cited by the Examiner

UNITED STATES PATENTS

| 2,427,597 | 9/1947 | Garner | 29—470.1 X |
| 2,639,633 | 5/1953 | Sowter | 78—72 |
| 2,697,954 | 12/1954 | Sowter | 29—470.1 |
| 2,704,169 | 3/1955 | Ishler et al. | 220—2.2 |
| 2,736,090 | 2/1956 | Sowter et al. | 29—470.1 |
| 2,441,841 | 5/1959 | Phelps | 78—82 |
| 2,886,992 | 5/1959 | Barnes et al. | 78—82 |

CHARLES W. LANHAM, *Primary Examiner.*

WILLIAM J. STEPHENSON, *Examiner.*

J. F. CAMPBELL, G. P. CROSBY,
*Assistant Examiners.*